United States Patent
Mies

(10) Patent No.: US 6,209,966 B1
(45) Date of Patent: Apr. 3, 2001

(54) ELECTRICALLY CONTROLLED BRAKING SYSTEM FOR A WHEELED VEHICLE

(75) Inventor: Hubertus Mies, Lohr/Main (DE)

(73) Assignee: Mannesmann Rexroth AG, Lohr/Main (DE)

( * ) Notice: Subject to any disclaimer, the term of this patent is extended or adjusted under 35 U.S.C. 154(b) by 0 days.

(21) Appl. No.: 09/380,441

(22) PCT Filed: Feb. 28, 1998

(86) PCT No.: PCT/EP98/01141

§ 371 Date: Aug. 31, 1999

§ 102(e) Date: Aug. 31, 1999

(87) PCT Pub. No.: WO98/39189

PCT Pub. Date: Sep. 11, 1998

(30) Foreign Application Priority Data

May 3, 1997 (DE) .............................................. 197 08 832

(51) Int. Cl.$^7$ ..................................................... B60T 13/74
(52) U.S. Cl. .................................. 303/3; 303/9.63; 303/15
(58) Field of Search ................................. 303/3, 20, 9.63, 303/9, 9.66, 13, 14, 15, 123, DIG. 6, 119.1, 119.2

(56) References Cited

U.S. PATENT DOCUMENTS

| | | |
|---|---|---|
| 4,802,562 | 2/1989 | Kuroyanagi, et al. . |
| 5,131,729 | * 7/1992 | Wetzel ............................... 303/113.2 |
| 5,217,283 | * 6/1993 | Watanabe ............................ 303/113.2 |
| 5,718,486 | * 2/1998 | Vollmer et al. ............................ 303/3 |

FOREIGN PATENT DOCUMENTS

| | | |
|---|---|---|
| 3144961 | 5/1983 | (DE) . |
| 3230970 | 2/1984 | (DE) . |
| 4107330 | 9/1991 | (DE) . |
| 19510522 | 9/1996 | (DE) . |
| 4108417 | 5/1997 | (DE) . |
| 0207275 | 1/1987 | (EP) . |
| 0234290 | 9/1987 | (EP) . |
| 0268045 | 5/1988 | (EP) . |
| 0389416 | 9/1990 | (EP) . |
| 0780276 | 6/1997 | (EP) . |

* cited by examiner

Primary Examiner—Christopher P. Schwartz
Assistant Examiner—Pamela J. Rodriguez
(74) Attorney, Agent, or Firm—Martin A. Farber

(57) ABSTRACT

An invention relates to an electrically controlled braking system which is intended for use on a wheeled vehicle and has input means which can be actuated by a driver of the vehicle in accordance with the desired braking effect, two electronic control units, which operate independently of each other and each of which can be supplied with an electrical signal corresponding to the extent of actuation of the input means, which can be recorded by a sensor, a brake cylinder assigned to a wheel and a braking pressure modulator valve which is fluid-connected to the brake cylinder and has a first electric actuating element, which can be activated by a first of the two control units. To make the braking system very safe, the braking pressure modulator valve has a second electric actuating element which acts in the same direction when activated, as the first electric actuating element. The second electric actuating element can be activated by the second electronic control unit at the same time as the first electric actuating element is being activated by the first electronic control unit.

13 Claims, 2 Drawing Sheets

ELECTRICALLY CONTROLLED BRAKING SYSTEM FOR A WHEELED VEHICLE

FIELD AND BACKGROUND OF THE INVENTION

The invention takes as its starting point an electrically controlled braking system which is intended for a wheeled vehicle.

A braking system of this kind is known from U.S. Pat. No. 4,802,562, FIG. 9. As is customary, the input means are there formed by a brake pedal, which is pressed down by a driver of a vehicle in accordance with the retardation of the vehicle he requires. The brake pedal is assigned two sensors, which can, for example, be designed as rotary potentiometers. Each sensor records the extent of actuation of the brake pedal and outputs an electrical output signal corresponding to this extent. In the case of the known braking system, two electronic control units which operate independently of each other are furthermore provided, one control unit being supplied with the output signal of one sensor and the other control unit being supplied with the output signal of the other sensor at the brake pedal as an input signal. Each wheel of the vehicle is assigned a brake cylinder and a braking pressure modulator valve which is fluid-connected to the brake cylinder and has an electric actuating element, namely a piezoelectric actuator. The two electric actuating elements of two braking pressure modulator valves can only be activated by one control unit and the two actuating elements of two other braking pressure modulator valves can only be activated by the other control unit. If one control unit fails, therefore, only two braking pressure modulator valves continue to operate.

DE 31 44 961 A1 has disclosed a braking system for a wheeled vehicle in which actuating a brake pedal adjusts a pneumatic or hydraulic pilot control valve and an angle transmitter. A braking pressure modulator valve can be adjusted, on the one hand, pneumatically, or hydraulically by means of a pressure fed in by the pilot control valve or by an electromagnet which is activated in accordance with the position of the angle transmitter. In this braking system, if one control circuit fails the braking pressure modulator valve can still be actuated with the aid of the other control circuit.

SUMMARY OF THE INVENTION

The object on which the invention is based is to develop an electrically controlled braking system of the above mentioned type in such a way that safety is enhanced.

According to the invention in an electronically controlled braking system of this type, this object is achieved wherein the braking system pressure modulator valve has a second electric actuating element which acts in the same direction, when activated, as the first electric actuating element, and by the fact that the second electric actuating element can be activated by the second electronic control unit at the same time as the first electric actuating element is being activated by the first electronic control unit.

Whereas, therefore, in the braking system of U.S. Pat. No. 4,802,562, each braking pressure modulator valve can be activated only by one of the two control units, this is performed by each of the two control units in a braking system according to the invention. If the braking pressure modulator valve is constructed as a proportionally adjustable pressure-regulating valve, both electric actuating elements normally act against a force, produced by the braking pressure, acting on the regulating piston of the braking pressure modulator valve. If a control unit or an electric actuating element fails, there is therefore only half the force and hence also only half the braking pressure available in a particular position of the input means. However, braking is still possible at each wheel or each axle, it being possible to at least partially compensate for the failure of an actuating element by increased actuation of the input means. If the braking pressure modulator valve is an on-off valve, this can be constructed in such a way that its moving valve member can also be switched by each electric actuating element alone. If an actuating element fails, the same braking pressure can then be produced in a particular position of the input means as when the system is operating correctly.

According to the particularly preferred configuration, the two electronic control units are supplied separately with an electric voltage. This ensures that, if a voltage supply fails, one of the two control units still functions.

It is very advantageous, particularly in the case of heavy trucks wherein, the two control units can be supplied with electrical signals from sensors by means of which the axle loads are recorded. The braking effects at a front axle and at a rear axle of the vehicle can then be matched to one another approximately in accordance with the optimum braking force distribution, and allowance is also made for the fact that, if at all, the wheels at the front axle of the vehicle should be allowed to lock up before those on the rear axle.

It is advantageous wherein the axle loads and other vehicle parameters are recorded by two sensors. The electrical output signal of each sensor is supplied to both control units, with the result that, if one sensor fails, both control units still function correctly. Here, the control units can, for example, control the braking pressure modulator valves in accordance with the output signal of one of the two sensors which entails the lower braking pressure at one wheel.

A particularly preferred configuration is wherein there is an electronic monitoring unit which can be supplied with the electrical output signal of a sensor and which triggers an alarm signal if the sensor detects a defect in a component of the braking system or a defect in the sensor itself is detected.

BRIEF DESCRIPTION OF THE DRAWINGS

Two embodiment examples of an electrically controlled braking system according to the invention are illustrated in the drawings. The invention will now be explained in greater detail with reference to these drawings, in which.

DETAILED DESCRIPTION OF THE PREFERRED EMBODIMENTS

Figure 1:
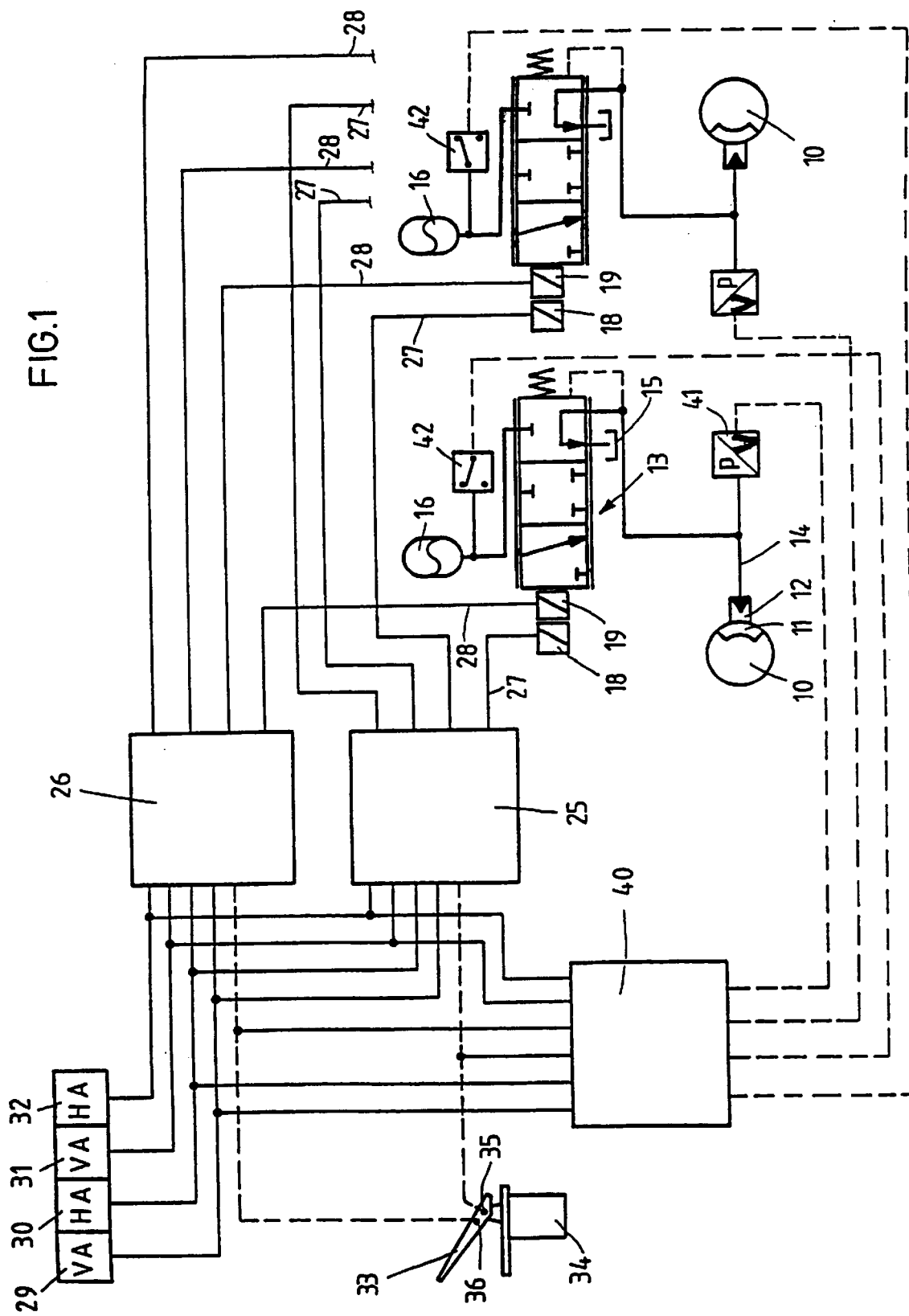
FIG. 1 shows the first embodiment example, in which the braking pressure modulator valves, are designed as pressure-regulating valves

Of the total number of brake disks 10 with brake pads 11 on a wheeled vehicle, FIG. 1 shows only two, this being fully sufficient for an understanding of the system because each wheel is assigned the same system components. The brake pads 11 can be pressed against the brake disk 10 by a brake cylinder 12. The force with which this occurs depends on the braking pressure to which the brake cylinder 12 is subjected and which is built up by a braking pressure modulator valve 13 in a brake line 14 leading from the load connection of the latter to the brake cylinder 12. The braking pressure modulator valve 13 is a proportionally adjustable pressure-regulating valve which, in addition to the load connection, has a return connection, which is connected to a tank 15, and a supply connection, which is connected to a pressure-medium source 16, which is represented as an accumulator. The regulating piston of the braking pressure modulator valve 13 is acted upon by the pressure in the load connection and by a weak compression spring 17 in the direction of a connection of the load connection to the return connection. A force can be exerted jointly on the regulating piston in the opposite direction, i.e. in the direction of a connection of the load connection to the supply connection, by two electromagnets 18 and 19 arranged axially one behind the other. The two electromagnets are proportional magnets, and the force exerted by them thus depends on the level of electric current flowing through them. The braking pressure that is in each case established in the brake line 14 is such that, together with the compression spring 17, this braking pressure is in equilibrium with the force of the electromagnets.

An electrically controlled braking system according to the invention includes a first electronic control unit 25 and a second electronic control unit 26, in which the output signals of various sensors are combined and control signals for the electromagnets 18 and 19 are determined from them. In this arrangement, the electromagnets 18 of all the braking pressure modulator valves are activated by the first control unit 25 by means of separate outputs and separate control lines 27, and the electromagnets 19 of all braking pressure modulator valves are activated by the second control unit 26 by means of separate outputs and separate control lines 28. Each control unit 25 or 26 is supplied with the electrical output signal of a first sensor 29 and of a second sensor 31, which both record the axle load, e.g. at a front axle of the vehicle fitted with the braking system shown. Two further sensors 30 and 32 each record the axle load at a rear axle of the vehicle. The output signals of these two sensors are also supplied to each of the two control units 25 and 26. These control units use the lower output signal, for example, of the two sensors assigned to an axle to determine the braking force required for a desired retardation and to determine the distribution of braking force between the axles. The desired retardation of the vehicle is specified by the driver of the vehicle by means of the displacement of a brake pedal 33, which thus serves as a means for inputting the desired braking effect. The brake pedal can be pivoted against the force of a spring arrangement which is accommodated in a housing 34 and which supplies an increasing force as the pivoting angle increases and hence simulates a braking force for the driver of the vehicle. The pivoting angle of the brake pedal 33 is recorded by two angle transmitters 35 and 36, of which angle transmitter 35 sends its output signal to control unit 25 and angle transmitter 36 sends its output signal to control unit 26. Barring any tolerances, the output signals of the angle transmitters 35 and 36 represent the same desired value for the braking of the vehicle.

In addition to control units 25 and 26 there is another electronic unit, namely a monitoring unit 40 which is supplied with the output signals of the load sensors 29 to 32 and of the two angle transmitters 35 and 36. The monitoring unit 40 compares the output signals of the two angle transmitters and of the two load sensors, each of the latter being assigned to one axle, and outputs an alarm signal if the absolute value of the difference of the two output signals exceeds a predetermined value.

Connected to each brake line 14 is a pressure sensor 41, the output signal of which is fed to the monitoring stage 40. As with the control units 25 and 26, this monitoring stage determines the braking pressure required at a wheel from the output signals of the angle transmitters 35 and 36 and of the load sensors 29 to 32 and compares it with the value which the pressure sensor 41 has recorded. If the deviation between the calculated braking pressure and the recorded braking pressure is outside a particular range, the monitoring unit initiates the output of an alarm signal. The monitoring unit 40 does not have any power electronics as required by the control units 25 and 26 to activate the electromagnets 18 and 19. The pressure at the supply inlets of the braking pressure modulator valves 13 is in each case monitored by a pressure switch 42, which responds when the pressure at the supply inlet of a braking pressure modulator valve 13 falls below a particular value. The fact that a switch 42 has responded is signaled to the monitoring unit 40, which once again initiates an alarm signal. The pressure sensors 41 thus allow a malfunction of a control unit of a braking pressure modulator valve, a brake cylinder or a pressure-medium source or a fault in the electric and hydraulic connecting lines between said components to be detected during a braking operation. The pressure switch 42 also detects a pressure drop at the supply inlet of a valve 13 when no braking operation is taking place.

The braking system shown in FIG. 1 is configured in such a way that it can brake the vehicle with a particular maximum retardation at maximum permissible axle loads of the vehicle. The electromagnets 18 and 19 of the braking pressure modulator valves 13 are then subjected to a maximum current by the control units 25 and 26. If one of the electromagnets 18 or 19 at one braking pressure modulator valve fails, a maximum 50% of the maximum braking pressure can still be built up at the associated wheel insofar as both electromagnets 18 and 19 of a valve 13 are of identical design and are each activated in the same way. However, it is also conceivable, when one electromagnet fails, to subject the other for at least a brief period to excess current, which is reduced rampwise.

In the embodiment shown in FIG. 2, there is once again a brake pedal 33, which is assigned two angle transmitters 35 and 36 and a simulator 34 for a foot force. Axle load sensors 29 to 32 detect the load borne by an axle. Control units 25 and 26 activate magnets 18 and 19 of pressure modulator valves 13, which, exactly as in the case of the valves 13 in the embodiment shown in FIG. 1, have a supply connection, a return connection and a load connection which is connected by a line 14 to a brake cylinder 12.

Figure 2:
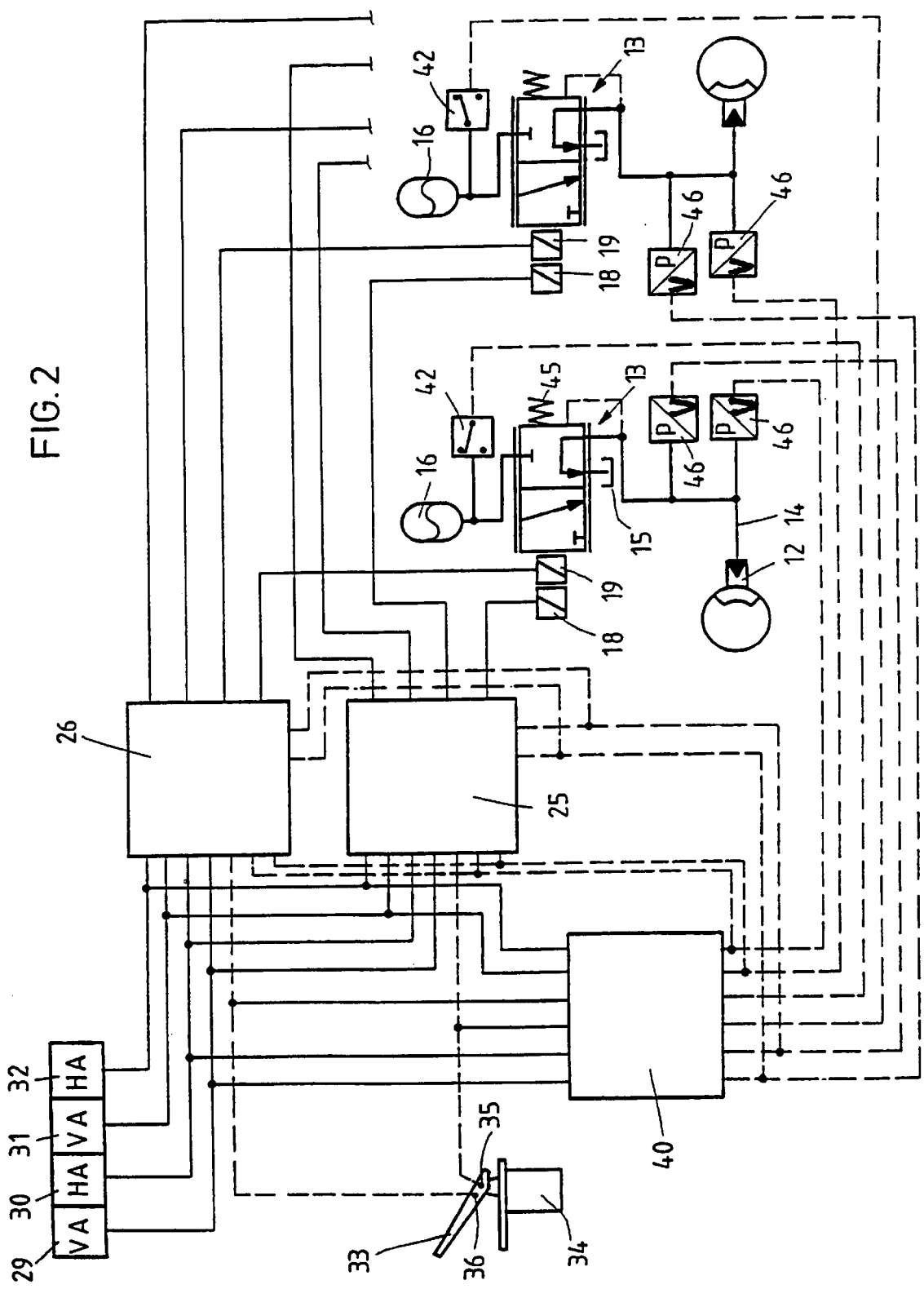
FIG. 2 shows a second embodiment example, in which the braking pressure modulator valves are on-off valves and the braking pressure is recorded by two pressure sensors, the output signals of which are supplied to both control units.

The embodiment shown in FIG. 2 differs from that in FIG. 1 essentially in that the braking pressure modulator valves 13 are now on-off valves which, owing to the force of a strong compression spring 45, adopt a rest position in which the load connection is connected to the tank 15. Each of the two electromagnets 18 and 19 can move the valve member of a valve 13 on their own or jointly with the other electromagnet into a second position, in which the load connection is connected to the supply connection. The pressure in the brake line 14 is recorded by two pressure sensors 46, the output signals of which are supplied both to the monitoring unit 40 and to both control units 25 and 26. These control units activate the magnets 18 and 19 of a braking pressure modulator valve 13 in such a way that the pressure established in the brake line 14 brings about the braking effect specified by means of the brake pedal 33. Here, the control units 25 and 26 take, for example, the lower of the two pressure values recorded by the two pressure sensors connected to a brake line 14 as given. The monitoring unit 40 responds if the difference between the two pressure values determined by the pressure sensors 46 connected to a brake line 14 exceeds a predetermined magnitude.

In contrast to the embodiment shown in FIG. 1, it is possible in the embodiment shown in FIG. 2 for the full braking pressure to be supplied in a brake line 14, even if one of the two electromagnets 18 or 19 fails since each electromagnet alone can actuate the valve 13.

What is claimed is:

1. An electrically controlled braking system for a wheeled vehicle, comprising input means (33) which can be actuated by a driver of the vehicle in accordance with a desired braking effect, two electronic control units (25, 26), which operate independently of each other and each of which is suppliable with an electrical signal corresponding to extent of actuation of the input means (33), which is recordable by a sensor (35, 36), a brake cylinder (12) associated with a wheel of the vehicle, and a braking pressure modulator valve (13) which is fluid-connected to the brake cylinder (12) and has a first electric actuating element (18, 19), which can be activated by a first of the two control units (25, 26), and wherein, the braking pressure modulator valve (13) has a second electric actuating element (19, 18) which acts in the same direction, when activated, as the first electric actuating element (18, 19), and the second electric actuating element (19, 18) can be activated by the second electronic control unit (26, 25) at the same time as the first electric actuating element (18, 19) is being activated by the first electronic control unit (25, 26).

2. The electrically controlled braking system as claimed in claim 1, wherein the two electronic control units (25, 26) are supplied separately with an electric voltage.

3. The electrically controlled braking system as claimed in claim 1, wherein the input means (33) are associated with two sensors (35, 36) for determining the extent of actuation and wherein one said control unit (25) is suppliable with an electrical signal from one sensor (35) and the other said control unit (26) is suppliable with an electrical signal from the other sensor (36).

4. The electrically controlled braking system as claimed in claim 3, wherein an electronic monitoring unit (40) is provided which is suppliable with the electrical output signal of said sensors (35, 36) and which triggers an alarm signal if a defect is detected in one of the system components monitored by said sensors or in said sensors themselves.

5. The electrically controlled braking system as claimed in claim 1, wherein the two control units (25, 26) are suppliable with electrical signals from sensors (29, 30, 31, 32) by means of which the magnitude of variable vehicle parameters can be recorded.

6. The electrically controlled braking system as claimed in claim 5, wherein the two control units (25, 26) are suppliable with electrical signals from said sensors (29, 30, 31, 32) by means of which the axle loads can be recorded.

7. The electrically controlled braking system as claimed in claim 5, wherein a same vehicle parameter is recordable by two of said sensors (29, 30, 31, 32) and the electric output signal of each of said two sensors (29, 30, 31, 32) is suppliable to both of said control units (25, 26).

8. The electrically controlled braking system as claimed in claim 5, wherein an electronic monitoring unit (40) is provided which is suppliable with the electrical output signal of one of said sensors (29, 30, 31, 32) and which triggers an alarm signal if a defect is detected in one of the system components monitored by said one of said sensors or in said one of said sensors itself.

9. The electrically controlled braking system as claimed in claim 1, wherein the braking pressure modulator valve (13) is a proportional pressure-regulating valve.

10. The electrically controlled braking system as claimed in claim 1, wherein the braking pressure modulator valve (13) is an on-off valve, and a pressure sensor (46), an electrical output signal of which is suppliable to both of said control units (25, 26), is connected to a fluid connection (14) between the braking pressure modulator valve (13) and the brake cylinder (12).

11. The electrically controlled braking system as claimed in claim 10, wherein two pressure sensors (46) are connected to the fluid connection (14) between the braking pressure modulator valve (13) and the brake cylinder (12) and the output signals of both said pressure sensors (46) are suppliable to both said control units (25, 26).

12. The electrically controlled braking system as claimed in claim 11, wherein an electronic monitoring unit (40) is provided which is suppliable with the electrical output signal respectively of the two pressure sensors (46) and which triggers an alarm signal if a defect is detected in one of the system components monitored by the pressure sensors or in the pressure sensors themselves.

13. The electrically controlled braking system as claimed in claim 10, wherein an electronic monitoring unit (40) is provided which is suppliable with the electrical output signal of the pressure sensor (46) and which triggers an alarm signal if a defect is detected in one of the system components monitored by the pressure sensor or in the pressure sensor itself.

* * * * *